Figure 1:
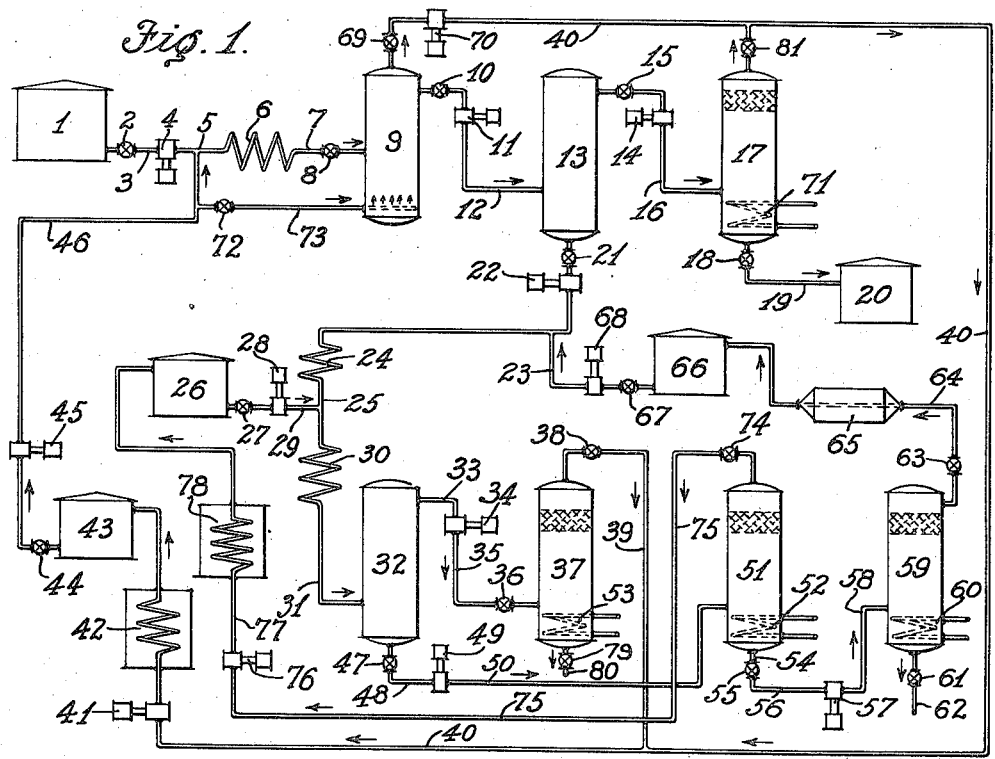

May 25, 1937.                P. SUBKOW                2,081,310
CO-PRECIPITATION OF ASPHALT AND WAX

Filed May 16, 1932

INVENTOR.

Philip Subkow

Patented May 25, 1937

2,081,310

UNITED STATES PATENT OFFICE 2,081,310

CO-PRECIPITATION OF ASPHALT AND WAX

Philip Subkow, Los Angeles, Calif., assignor to Union Oil Company of California, Los Angeles, Calif., a corporation of California Application May 16, 1932, Serial No. 611,712

14 Claims. (Cl. 196—13)

This invention relates to a process for the separation of asphalt and wax from oil.

It is customary at the present time to separate asphalt from oil either by distillation or by solvent extraction. Where distillation is employed the oil being more volatile than the asphalt is vaporized leaving the asphalt as a residue containing more or less oil. Providing wax is present in the oil it is partially distilled overhead in the medium and heavy overhead distillate fractions. However, a complete separation of the wax from the still residue cannot be obtained by ordinary distillation means.

If it is desired to separate the wax from the overhead fractions or distillates this may be accomplished by such processes as cold settling, cold pressing or the centrifuge methods which are well known to those skilled in the art.

Where solvent extraction is employed for the separation of oil from asphalt it is customary to employ a solvent in which the oil is relatively soluble and in which the asphalt is relatively insoluble. Thus where naphtha, gasoline or even the lighter hydrocarbons, such as liquid butane, propane or ethane are employed as selective solvents, to separate oil from asphalt, the asphalt being substantially insoluble in the foregoing solvents is left as a residue and the oils are separated from this insoluble residue as solutions dissolved in the foregoing respective solvents. Where wax is present in the asphaltic oil this material is separated in solution along with the oil from the insoluble asphalt. If it is desired to separate the wax from the oil this may be accomplished by chilling the solvent solution of oil by any appropriate means and then separating the precipitated wax from the solvent solution of oil by settling, filtering or centrifuging.

Thus the separation of oil from oil containing asphalt and wax involves two distinct steps. First, the oil and a substantial portion of the wax are separated from the asphalt either by distillation or solvent extraction, as has been explained above, and second, the waxy oil recovered is subjected to any of the methods well known to the art for the separation of the wax from the oil.

When oil containing asphalt and wax is commingled under pressure with liquid propane, the oil and wax are dissolved but the asphalt remains undissolved as small discrete particles. If a portion of the liquid propane is vaporized under reduced pressure the mass is chilled to a temperature sufficiently low to precipitate the wax. The vaporization of the liquid propane under reduced pressure causes the mass to boil and the agitation produced thereby maintains the small asphalt particles in suspension throughout the mass. These suspended asphalt particles agglomerate the wax as it is precipitated at the lower temperatures. The asphalt-wax mixture may then be separated from the solvent solution of oil by such means as filtering, centrifuging or settling. If desired, the mixture of asphalt and wax may be washed with liquid propane at ordinary temperatures to separate the wax from the asphalt. The wax being soluble at ordinary temperatures, is dissolved by the liquid propane and the undissolved asphalt may be separated as an insoluble residue from the propane solution of wax.

I have discovered that a more complete separation of the wax from the asphalt can be obtained by commingling the mixture in a solvent or combination of solvents in which both the wax and asphalt are dissolved and then adding another solvent or combination of solvents which causes the asphalt to precipitate as an insoluble residue. By my re-solution and re-precipitation method I am able to separate wax occluded in the asphalt particles which cannot be separated therefrom by washing the asphalt-wax mixture with a solvent such as liquid propane.

My separation process consists in commingling the precipitated asphalt-wax mixture in sufficient kerosene or gas oil or other light petroleum fractions to dissolve completely the wax-asphalt mixture and then adding sufficient liquid propane to re-precipitate the asphalt. The propane solution of wax is then decanted away from the precipitated asphalt after which it is distilled to separate the propane from the wax. As a further modification of my process I may commingle the asphalt-wax mixture, containing a small amount of liquid propane, with a sufficient quantity of the liquid sulphur dioxide soluble portion of naphthene base kerosene or gas oil to produce complete solution of the asphalt-wax mixture, and then commingle this solution with liquid sulphur dioxide to produce an insoluble phase consisting substantially of wax dissolved in liquid propane and a soluble or extract phase consisting substantially of liquid sulphur dioxide, sulphur dioxide soluble fractions of kerosene or gas oil and asphalt. By allowing the commingled mixture to settle a separation of the phases is effected in which the propane solution of wax forms the upper phase and the sulphur dioxide, sulphur dioxide soluble fractions of kerosene or gas oil and asphalt form the lower phase. The separated phases may then be removed from the separator and fractionated, as will be more fully explained hereafter. In place of liquid sulphur dioxide I may employ other solvents which are capable of dissolving aromatic oil and asphalt. For example, I may substitute aniline, nitrobenzene, furfural, selenium oxychloride, methyl formate or dichlorethylether for liquid sulphur dioxide.

It is, therefore, an object of my invention to separate asphalt and wax together or simultaneously from oil containing these constituents and subsequently to separate the wax from the asphalt.

It is another object of my invention to produce substantially wax free asphalt from a mixture of asphalt and wax by commingling the said mixture in a solvent capable of dissolving asphalt and wax and then adding another solvent or combination of solvents capable of separating the wax from the asphalt.

Figure 2:
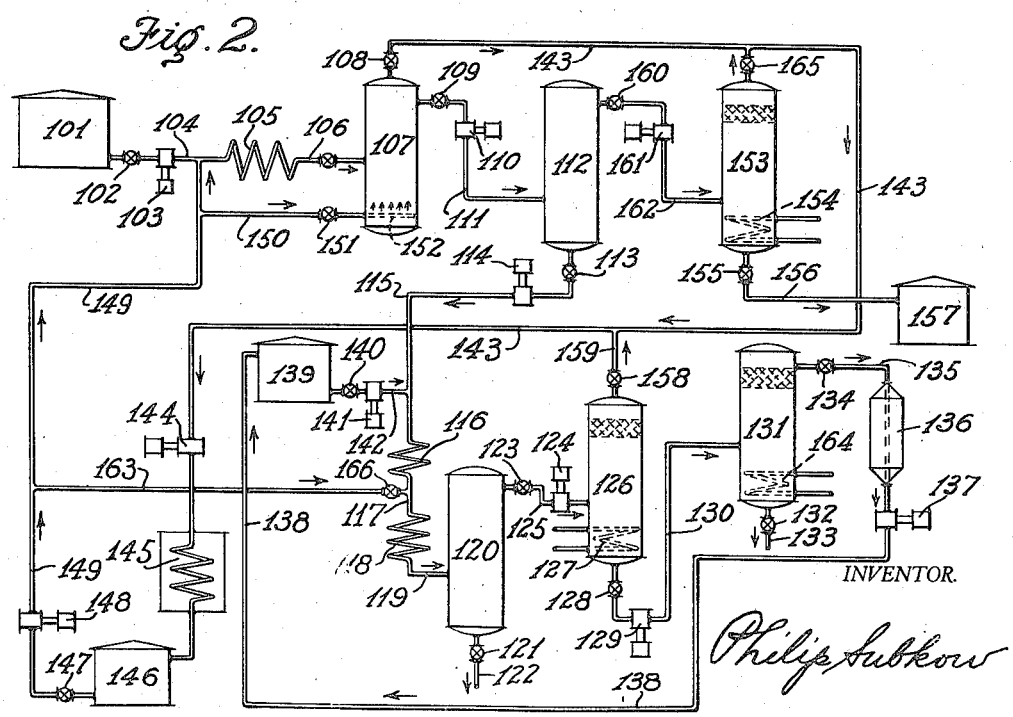

Figures 1 and 2 are schematic arrangements of apparatus which I may employ to carry out my invention.

Referring more particularly to Figure 1, oil containing asphalt and wax at a temperature above its congealing point is removed from tank 1 through valve 2 and line 3 to pump 4 which forces it through line 5 to agitator 6 where it meets a stream of liquid propane coming from tank 43 through valve 44, pump 45 and line 46. The thoroughly agitated mass in agitator 6 passes by means of line 7 and valve 8 to chilling chamber 9 where liquid propane is vaporized under reduced pressure to lower the temperature of the propane solution of wax and oil sufficiently to precipitate the wax. The pressure release in chamber 9 is effected by opening valve 69 which allows the propane in chamber 9 to vaporize and pass to pump 70 which forces it through line 40 into compressor 41 which forces it through condenser 42 where it is liquefied and then passes into propane storage tank 43.

Due to the consumption of liquid propane for chilling purposes the chilled mass in chamber 9 may become too thick or viscous for proper handling. To overcome this difficulty an additional amount of liquid propane may be introduced into chamber 9 from line 46 through valve 72 and line 73. This additional amount of liquid propane not only maintains the chilled mass in the proper state of fluidity but also serves as an excellent means of agitating the contents of chamber 9 thus insuring good contact between the precipitated asphalt and wax.

The chilled mass is withdrawn from chamber 9 through valve 10 into pump 11 which forces it through line 12 into settling chamber 13 where the precipitated asphalt-wax mixture is allowed to settle out. The propane solution of oil in settling chamber 13 is removed through valve 15 into pump 14 which forces it through line 16 into evaporator 17 where the propane is vaporized from the oil by the aid of steam introduced through closed coil 71. The vaporized propane passes out through valve 81 into line 40 and thence to compressor 41 which forces it into condenser 42 where it is liquefied and passes back to propane storage tank 43. The propane free oil in evaporator 17 is removed through valve 18 and line 19 to storage tank 20.

The asphalt-wax mixture containing some propane and oil is removed from settling chamber 13 through line 21 to pump 22 which forces it to agitator 24 where it is completely dissolved in the liquid sulphur dioxide soluble fraction of kerosene or gas oil coming from tank 66 through valve 67, pump 68 and line 23. The solution of asphalt and wax dissolved in the sulphur dioxide soluble portion of kerosene or gas oil in agitator 24 is removed through line 25 into agitator 30 where it is mixed with liquid sulphur dioxide coming from tank 26 through valve 27, pump 28, line 29 and line 25. The thoroughly agitated mass in agitator 30 is removed through line 31 to settling chamber 32 where the phases are allowed to separate. The upper phase consisting of liquid propane and wax is removed through line 33 to pump 34 which forces it through line 35 and valve 36 to evaporator 37 where the propane is vaporized by the aid of steam introduced through closed steam coil 53. The vaporized propane is removed through valve 38, line 39 and line 40 to compressor 41 which forces it to condenser 42 where it is liquefied and passes to propane storage tank 43. The molten wax in evaporator 37 is removed through valve 79 and line 80 to storage, not shown.

The lower phase in settling chamber 32 is removed through valve 47 and line 48 to pump 49 which forces it through line 50 into evaporator 51 where the sulphur dioxide present is vaporized and passes by means of valve 74 and line 75 to compressor 76 which forces it through line 77 to condenser 78 where it is liquefied and passes to sulphur dioxide storage tank 26.

The mixture of asphalt and liquid sulphur dioxide soluble portion of kerosene or gas oil is removed from vaporizer 51 through line 54, valve 55 and line 56 to pump 57 which forces it through line 58 into vaporizer 59 where the liquid sulphur dioxide soluble portion of kerosene or gas oil is vaporized and is removed through valve 63 and line 64 to condenser 65 where it is condensed and passes to storage tank 66.

The molten asphalt in evaporator 59 is removed through valve 61 and line 62 to storage, not shown.

Referring more particularly to Figure 2, oil containing asphalt and wax above its congealing temperature is withdrawn from tank 101 through valve 102 to pump 103 which forces it through line 104 to agitator 105 where it is thoroughly mixed with liquid propane coming from tank 146 through valve 147, pump 148 and line 149. The thoroughly mixed mass in agitator 105 is withdrawn through line 106 into chiller 107. Here sufficient liquid propane is vaporized under reduced pressure to lower the temperature of the propane solution of oil and wax to a temperature sufficiently low to precipitate the wax. The vaporized propane is removed through valve 108 into line 143 from whence it passes to compressor 144 which forces it to condenser 145 where it is liquefied and passes to propane storage tank 146. In order to maintain a fairly constant ratio of liquid propane to oil in chiller 107 additional propane may be introduced through line 150 and valve 151. The additional propane introduced into the lower zone of chiller 107 not only serves to maintain proper fluidity of the mass but also serves to agitate the mass therein and insure contact between the precipitated asphalt and wax.

The chilled mass in chiller 107 is removed through valve 109 to pump 110 which forces it through line 111 into separator 112 where the precipitated asphalt and wax separate from the propane solution of oil. The propane solution of oil in separator 112 is removed through valve 160 to pump 161 which forces it through line 162 into vaporizer 153 where the propane present is vaporized by aid of steam introduced through coil 154 and passes through valve 165 and line 143 to compressor 144 which forces it to condenser 145 where it is liquefied and passes to propane storage tank 146.

The propane free oil in vaporizer 153 is removed through valve 155 and line 156 to storage tank 157.

The mixture of asphalt and wax in separator 112 is removed through valve 113 to pump 114 which forces it through line 115 to agitator 116 where it is dissolved in kerosene or gas oil introduced from tank 139 through valve 140 and pump 141. The solution of asphalt and wax in kerosene or gas oil passes from agitator 116 through line 117 to agitator 118 where it is mixed with liquid propane introduced from tank 146 through valve 147, pump 148, line 149, line 163, valve 166 and line 117. The thoroughly mixed mass in agitator 118 passes by means of line 119 to settling chamber 120 where the precipitated asphalt settles out and is withdrawn through valve 121 and line 122 to storage, not shown. The wax dissolved in gas oil or kerosene and liquid propane is removed from settling chamber 120 through valve 123 and line 125 to pump 124 which forces it into vaporizer 126 where the propane is vaporized by aid of steam introduced through closed coil 127. The vaporized propane in vaporizer 126 is removed through valve 158, line 159 and line 143 to compressor 144 which forces it to condenser 145 where it is liquefied and passes to propane storage tank 146.

The gas oil or kerosene solution of wax is removed from vaporizer 126 through valve 128 to pump 129 which forces it through line 130 to vaporizer 131 where the gas oil or kerosene is vaporized and passes through valve 134 and line 135 to condenser 136 where it is liquefied and is sent by means of pump 137 and line 138 to storage tank 139. The molten wax in vaporizer 131 is removed through valve 132 and line 133 to storage, not shown.

As the preferred method of carrying out my process oil containing asphalt and wax is mixed in agitator 105 with liquid propane in the proportion of four volumes of propane to one volume of oil. The mixture then passes into chiller 107 where sufficient propane is vaporized to lower the temperature to −10° F. or lower. During the chilling operation liquid propane is admitted into chilling chamber 107 from storage tank 146 through valve 147, pump 148, line 149, line 150, valve 151 and header 152. Header consists of a perforated pipe which admits the liquid propane in fine streams into the fluid mass. These fine streams of propane agitate the chilled mass and insure intimate contact between the precipitated asphalt and wax. The chilled mass in chilling chamber 107 passes to separator 112 where the mixture of asphalt and wax settles out. The propane solution of oil substantially free from asphalt and wax passes from settling chamber 112 to vaporizer 153 where the propane is separated from the oil. The separated oil passes to tank 157 and the propane is liquefied and passes to tank 146.

The asphalt-wax mixture in separator 112 passes to agitator 116 where it is dissolved in an equal volume of gas oil or kerosene. The solution of wax and asphalt in kerosene or gas oil then passes to agitator 118 where it is mixed with liquid propane in the proportion of five parts of liquid propane to one part of the asphalt and wax dissolved in kerosene or gas oil. The mixture in agitator 118 then passes to settling chamber 120 where the precipitated asphalt settles out and is withdrawn through valve 121 and line 122.

The wax dissolved in liquid propane and kerosene or gas oil then passes to vaporizer 126 where the propane is separated and returned to storage tank 146. The wax dissolved in kerosene or gas oil is then passed to vaporizer 131 where the kerosene or gas oil is separated and sent back to storage tank 139. The molten wax in vaporizer 131 is removed through valve 132 and line 133.

The above example is merely illustrative of one method of carrying out my process and is not to be construed as limiting the invention which I claim.

I claim:

1. A process for the production of purified wax from an oil containing wax and impurities which comprises separating the wax and impurities as a mixture from said oil and extracting said mixture of wax and impurities with a selective solvent in which said impurities are soluble and said wax is insoluble and another solvent in which the wax is soluble and the impurities are insoluble, separating the solution of wax and said last mentioned solvent from the solution of impurities and selective solvent.

2. A process as in claim 1 in which said last mentioned solvent comprises a liquefied normally gaseous hydrocarbon.

3. A process as in claim 1 in which said last mentioned solvent comprises liquid propane.

4. A process as in claim 1 in which the impurities separated from the oil in said first mentioned separation comprises asphalt.

5. A process for the separation of asphalt and wax mixtures into asphalt and wax which comprises forming a solution of said mixture of asphalt and wax in a first solvent and a second solvent comprising a petroleum fraction which is substantially completely soluble in a selective solvent for naphthenic oil fractions, extracting said solution with a selective solvent in which the asphalt and said second named solvent are soluble but in which the wax and said first named solvent are insoluble and separating the solution of selective solvent, asphalt and second solvent from the wax and first named solvent.

6. A process as in claim 5 in which the first solvent comprises liquefied normally gaseous hydrocarbon.

7. A process as in claim 5 in which the first solvent comprises liquid propane.

8. A process as in claim 5 in which a complete solution is made of both said asphalt and wax in said first and second solvents prior to extraction with said selective solvent.

9. A process for the production of purified wax from an oil containing wax and impurities which comprises commingling said oil with a diluent, chilling the diluted oil to separate the wax and impurities from the oil and diluent, removing the wax and impurities as a mixture from the oil and diluent and extracting said mixture of wax and impurities with a selective solvent in which said impurities are soluble and said wax is insoluble and another solvent in which the wax is soluble and the impurities are insoluble, separating the solution of wax and said last mentioned solvent from the solution of impurities and selective solvent.

10. A process as in claim 9 in which said last mentioned solvent is a liquefied normally gaseous hydrocarbon.

11. A process as in claim 9 in which said last mentioned solvent is liquid propane.

12. A process for the separation of asphalt and wax mixtures into asphalt and wax which comprises forming a solution of said mixture in liquid propane and the liquid sulphur dioxide soluble portion of kerosene, commingling said solution with liquid sulphur dioxide, separating wax dissolved in liquid propane and separating asphalt dissolved in the liquid sulphur dioxide soluble portion of kerosene and sulphur dioxide.

13. A process for the separation of asphalt and wax mixtures into asphalt and wax which comprises forming a solution of said mixture in liquid propane and the liquid sulphur dioxide soluble portion of kerosene, commingling said solution with liquid sulphur dioxide, separating wax dissolved in liquid propane, separating asphalt dissolved in the liquid sulphur dioxide soluble portion of kerosene and sulphur dioxide, separating the propane from the wax and separating the sulphur dioxide and sulphur dioxide soluble portion of kerosene from the asphalt.

14. A process of treating oil containing asphalt and wax which comprises commingling said oil under pressure in liquid propane to dissolve the oil and wax but not the asphalt, releasing the pressure and vaporizing sufficient liquid propane to chill the oil and precipitate the wax in the presence of the undissolved asphalt, separating the separated asphalt and wax containing a small quantity of propane and oil from the remainder of the propane and oil, forming a solution of the mixture of wax, asphalt, oil and propane with the sulphur dioxide soluble portion of kerosene, commingling said solution with liquid sulphur dioxide, separating the wax and oil dissolved in liquid propane and separating the asphalt dissolved in the sulphur dioxide soluble portion of kerosene and sulphur dioxide.

PHILIP SUBKOW.